US012671694B1

(12) United States Patent
Maghnani

(10) Patent No.: US 12,671,694 B1
(45) Date of Patent: Jun. 30, 2026

(54) INTELLIGENT SYSTEM FOR CLOUD CONTAINER ORCHESTRATOR INFRASTRUCTURE SECURITY

(71) Applicant: Bank of America Corporation, Charlotte, NC (US)

(72) Inventor: Vinod Maghnani, Gurugram Haryana (IN)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 19/043,658

(22) Filed: Feb. 3, 2025

(51) Int. Cl.
| | |
|---|---|
| *H04L 29/06* | (2006.01) |
| *G06F 21/62* | (2013.01) |
| *H04L 9/40* | (2022.01) |

(52) U.S. Cl.
CPC ........ *H04L 63/102* (2013.01); *G06F 21/6254* (2013.01)

(58) Field of Classification Search
CPC ............................ H04L 63/102; G06F 21/6254
See application file for complete search history.

(56) References Cited

U.S. PATENT DOCUMENTS

| | | | | |
|---|---|---|---|---|
| 10,326,744 | B1 * | 6/2019 | Nossik | ................ H04L 63/0435 |
| 2019/0312800 | A1 * | 10/2019 | Schibler | .................. H04L 41/16 |
| 2019/0372940 | A1 * | 12/2019 | McDougall | ......... G06F 21/6254 |
| 2020/0117831 | A1 * | 4/2020 | Eckhard | ................ H04L 9/0643 |
| 2022/0342997 | A1 * | 10/2022 | Watanabe | ............. G06F 21/577 |
| 2022/0400130 | A1 * | 12/2022 | Kapoor | ................... H04L 43/06 |
| 2024/0364747 | A1 * | 10/2024 | Gilburd | ................ H04L 9/0891 |
| 2025/0359950 | A1 * | 11/2025 | Brubaker | .............. A61B 34/30 |

FOREIGN PATENT DOCUMENTS

| | | | | | |
|---|---|---|---|---|---|
| CN | 117909083 | A | * | 4/2024 | ............... G06N 3/08 |

OTHER PUBLICATIONS

Melberg, Filip, and Vasiliki Kostara. "Automation and Orchestration for Machine Learning Pipelines A study of Machine Learning Scaling: Exploring Micro-service architecture with Kubernetes." (2024). (Year: 2024).*
Choudhary, Swati. "Kubernetes-Based Architecture For an On-premises Machine Learning Platform." (2021). (Year: 2021).*

* cited by examiner

*Primary Examiner* — Shawnchoy Rahman
(74) *Attorney, Agent, or Firm* — Weiss & Arons LLP

(57) ABSTRACT

A system for enhancing cloud container security in a cloud network. The systems may include a visualization tool for periodic surveillance of a cloud container. A visualization engine may utilize the data from the visualization tool to periodically measure the dynamic proximity of multiple Kubernetes to the cloud container. When multiple Kubernetes are functioning in proximity to the cloud container, a deep learning engine may determine a profile and a level of authorization for each Kubernetes in proximity of the cloud container using a Kubernetes profile database. The deep learning engine may determine the Kubernetes with the least level of authorization and forward that information to a machine learning ("ML") masking rule engine. The ML masking rule engine redacts and/or masks less sensitive information at a fixed point in time and more sensitive information dynamically in real time.

20 Claims, 10 Drawing Sheets

502

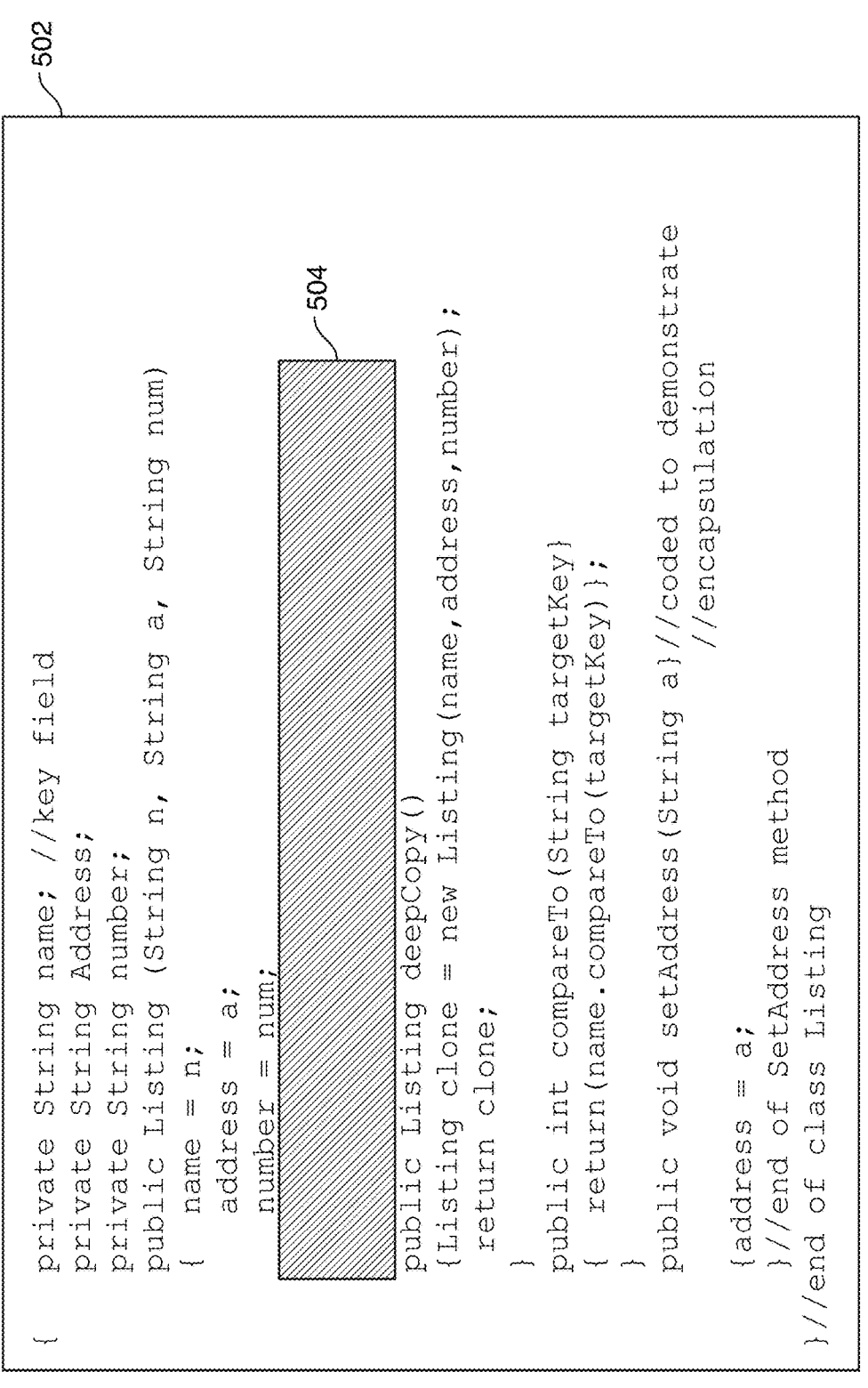

504

```
{
    private String name; //key field
    private String Address;
    private String number;
    public Listing (String n, String a, String num)
    {   name = n;
        address = a;
        number = num;

public Listing deepCopy()
    {Listing clone = new Listing(name,address,number);
        return clone;
    } public int compareTo(String targetKey}
    {  return(name.compareTo(targetKey)};
    } public void setAddress(String a}//coded to demonstrate
                                              //encapsulation
    {address = a;
    }//end of SetAddress method
}//end of class Listing
```

Based on Image feed of Kubernetes the masking engine detects optimal masking on source code displayed on a cloud container.

FIG. 5A

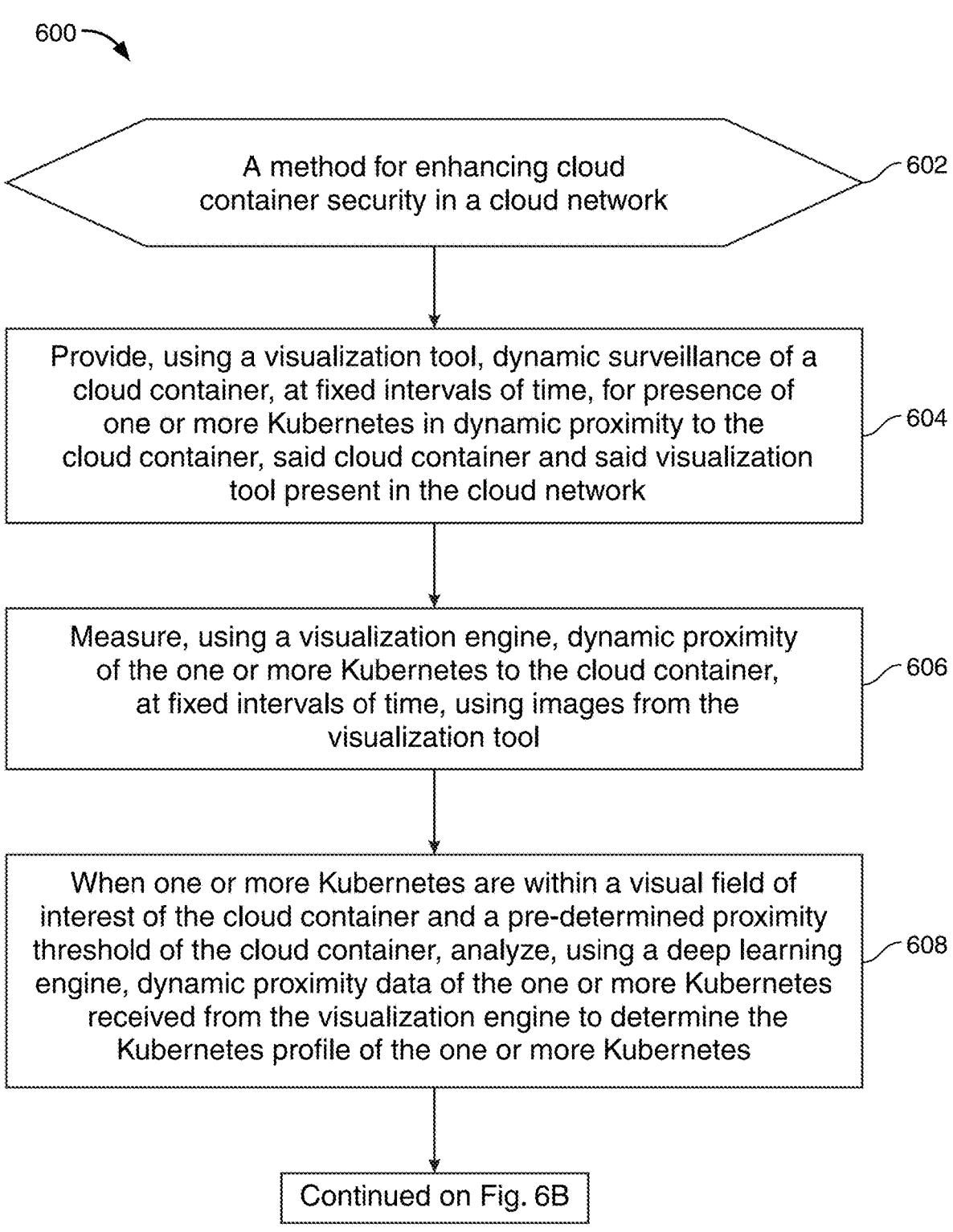

600

A method for enhancing cloud container security in a cloud network ⟋ 602

Provide, using a visualization tool, dynamic surveillance of a cloud container, at fixed intervals of time, for presence of one or more Kubernetes in dynamic proximity to the cloud container, said cloud container and said visualization tool present in the cloud network ⟋ 604

Measure, using a visualization engine, dynamic proximity of the one or more Kubernetes to the cloud container, at fixed intervals of time, using images from the visualization tool ⟋ 606

When one or more Kubernetes are within a visual field of interest of the cloud container and a pre-determined proximity threshold of the cloud container, analyze, using a deep learning engine, dynamic proximity data of the one or more Kubernetes received from the visualization engine to determine the Kubernetes profile of the one or more Kubernetes ⟋ 608

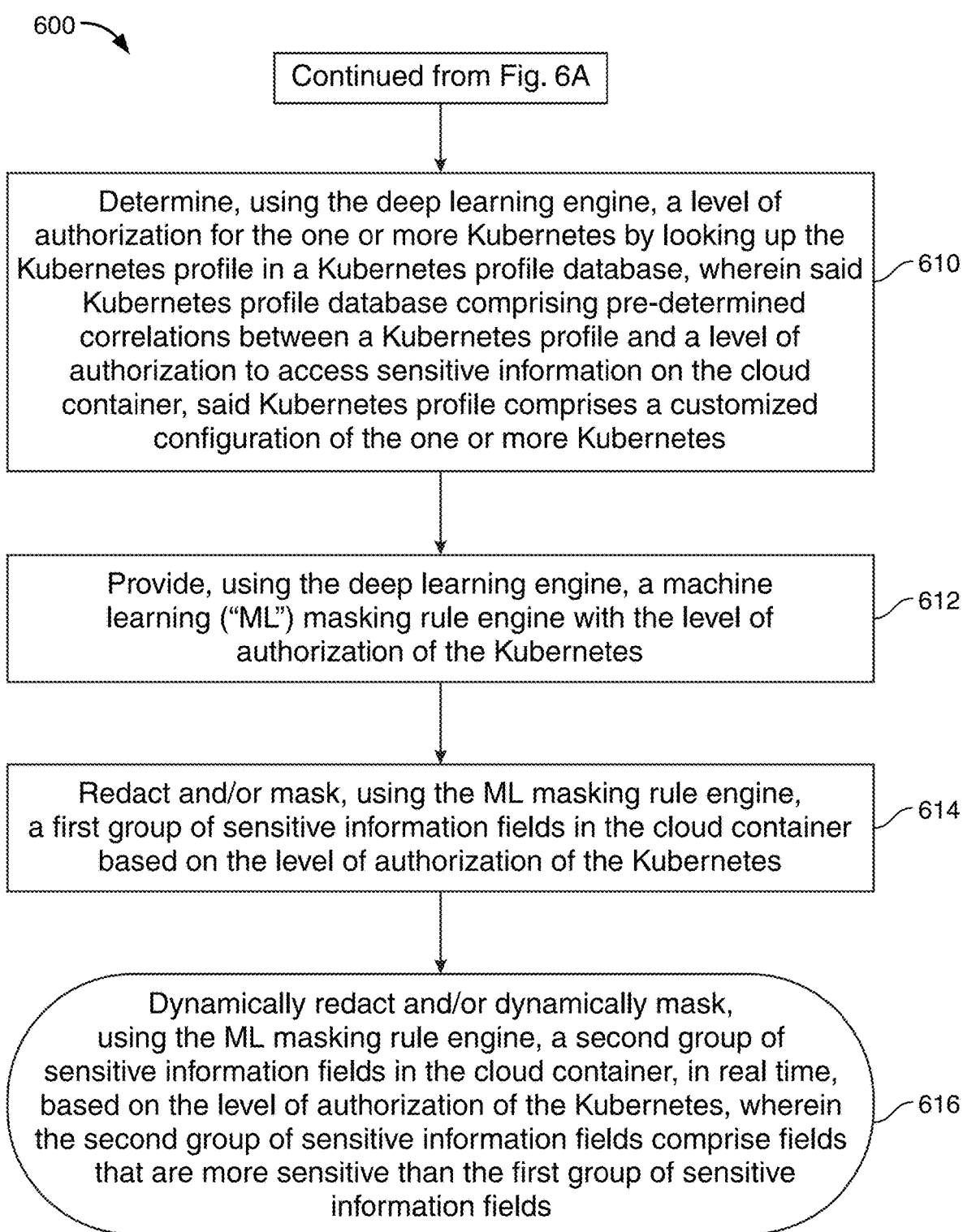

Continued from Fig. 6A

Determine, using the deep learning engine, a level of authorization for the one or more Kubernetes by looking up the Kubernetes profile in a Kubernetes profile database, wherein said Kubernetes profile database comprising pre-determined correlations between a Kubernetes profile and a level of authorization to access sensitive information on the cloud container, said Kubernetes profile comprises a customized configuration of the one or more Kubernetes          610

Provide, using the deep learning engine, a machine learning ("ML") masking rule engine with the level of authorization of the Kubernetes          612

Redact and/or mask, using the ML masking rule engine, a first group of sensitive information fields in the cloud container based on the level of authorization of the Kubernetes          614

Dynamically redact and/or dynamically mask, using the ML masking rule engine, a second group of sensitive information fields in the cloud container, in real time, based on the level of authorization of the Kubernetes, wherein the second group of sensitive information fields comprise fields that are more sensitive than the first group of sensitive information fields          616

FIG. 6B

INTELLIGENT SYSTEM FOR CLOUD CONTAINER ORCHESTRATOR INFRASTRUCTURE SECURITY

FIELD OF TECHNOLOGY

Aspects of this disclosure relate to enhancing cloud container security in a cloud network. Specifically, the disclosure relates to enhancing cloud container security in a cloud network during cloud container orchestration.

BACKGROUND

It may be challenging to protect information residing on cloud containers from unauthorized exposure to cloud container orchestrators such as Kubernetes®. Cloud containers during their usage may be prone to scenarios where unauthorized Kubernetes may obtain access to view sensitive information on the cloud containers.

Unauthorized users may potentially view information on a cloud container within a Kubernetes cluster if the cluster is not properly secured. For example, if a Kubernetes API server is misconfigured to allow anonymous access, sensitive information may be exposed within containers to anyone who can reach it. This access may be achieved by exploiting vulnerabilities in the API and/or through improper access controls. The unauthorized Kubernetes may access container logs, metadata, and even sensitive information stored within the container.

There is a need to provide dynamic security to sensitive information stored on the cloud containers, including their code and container image, when they are subject to orchestration on the cloud by Kubernetes.

SUMMARY

Provided are systems and methods that provide dynamic masking and/or redaction of sensitive information stored in cloud containers. This dynamic masking and/or redaction may protect sensitive information, in real time, from exposure to unauthorized cloud container orchestrators such as Kubernetes.

Provided are systems and methods for enhancing cloud container security in a network. Provided is a method for enhancing cloud container security in a network. The method may include using a visualization tool to provide dynamic surveillance of a cloud container. The dynamic surveillance may look for the presence of one or more Kubernetes in dynamic proximity to the cloud container. A visualization engine may measure the dynamic proximity of the Kubernetes to the cloud container using data from the visualization tool.

When one or more Kubernetes are within a pre-determined proximity threshold of the cloud container, a deep learning engine may analyze the dynamic proximity data of the Kubernetes received from the visualization engine. The deep learning engine may use this data to determine the Kubernetes profile of the one or more Kubernetes.

The deep learning engine may determine a level of authorization of the Kubernetes by looking up the Kubernetes profile in a Kubernetes profile database. The Kubernetes profile database may include a pre-determined correlation between a Kubernetes profile and a level of authorization to access sensitive information on the cloud container. The Kubernetes profile may include a customized configuration of one or more Kubernetes.

The deep learning engine may provide a machine learning ("ML") masking rule engine with the level of authorization of the Kubernetes. The ML masking rule engine may redact and/or mask a first group of sensitive information fields in the cloud container based on the first level of authorization of the Kubernetes. The ML masking rule engine may dynamically redact and/or mask a second group of sensitive information fields in the cloud container based on the second level of authorization of the Kubernetes. The second group of sensitive information fields may contain more sensitive than the first group of sensitive information fields.

When two or more Kubernetes are within the visual field of interest of the cloud container and within the pre-determined proximity threshold of the cloud container, the method may further include redacting and/or masking, using the ML masking engine, a first group of sensitive information fields in the cloud container based on a level of authorization of the first Kubernetes. The ML masking engine may dynamically redact and/or dynamically mask a second group of sensitive information fields in the cloud container, in real time, based on the level of authorization of the first Kubernetes. The second group of sensitive information fields may include fields that are more sensitive than the first group of sensitive information fields.

Based on a level of authorization of the second Kubernetes, the method may use the ML masking engine to redact and/or mask a third group of sensitive information fields in the cloud container. The ML masking engine may dynamically redact and/or dynamically mask a fourth group of sensitive information fields in the cloud container, in real time, based on the level of authorization of the second Kubernetes. The fourth group of sensitive information fields may include fields that are more sensitive than the third group of sensitive information fields. The first group of sensitive information fields and the third group of sensitive information fields may be different from each other. The second group of sensitive information fields and the fourth group of sensitive information fields may be different from each other.

Sensitive information may include information that, if accessed or disclosed without permission or authorization, may cause harm to an individual or an enterprise. The sensitive information may require protection from disclosure to unauthorized parties. Sensitive information may include private and/or confidential information that is not meant to be shared with others who are not authorized to view sensitive information. An authorized party who has received the sensitive information may also be required to maintain the sensitive information in confidence. Sensitive information encompasses any data that could cause harm if disclosed.

Some sensitive information may be more sensitive than other sensitive information. For example, more sensitive information may include information that needs to be held to a higher degree of confidentiality than less sensitive information. More sensitive information may require a higher degree of authorization than less sensitive information. In one aspect, authorization to view more sensitive information permits viewing less sensitive information, but authorization to view less sensitive information may not permit viewing more sensitive information. Degrees of sensitivity may be determined based on how much damage and/or harm a party who owns the sensitive information may suffer if the sensitive information falls into the hands of an unauthorized party such as a malicious party.

The cloud network may be a private cloud network. The cloud network may be a public cloud network. The cloud network may be a hybrid cloud network that includes aspects of a private cloud network and a public cloud network.

The cloud container may include a container image. Absent any redaction and masking of sensitive information fields in the cloud container, the container image may be visible to a Kubernetes when the Kubernetes is within the visual field of interest of the cloud container and/or is within the pre-determined proximity threshold of the cloud container.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5A shows an illustrative block diagram of masking on source code displayed on a cloud container;

FIG. 6A shows an illustrative flowchart of a system configured to enhance cloud container security in a cloud network;

FIG. 6B shows an illustrative flowchart of a system configured to enhance cloud container security in a cloud network;

DETAILED DESCRIPTION

Figure 1:
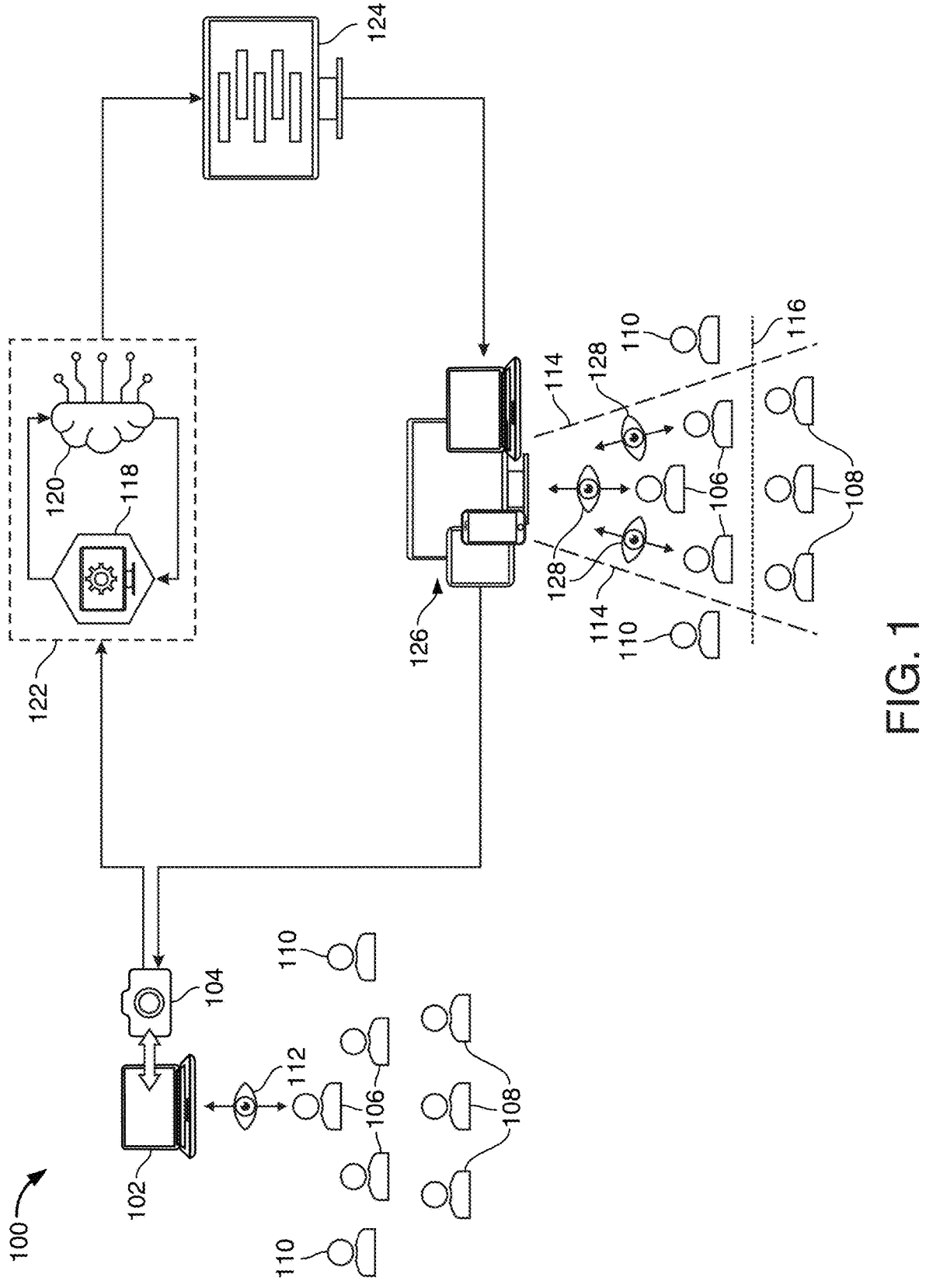
FIG. 1 shows an illustrative block diagram of a system configured to enhance cloud container security in a cloud network.

A cloud container orchestrator may include a cloud container orchestrator. A cloud container orchestrator infrastructure may refer to a system that automatically manages and scales containerized applications across a cloud environment. The cloud container orchestrator infrastructure may allow for seamless deployment, scaling, and monitoring of containerized workloads without manual intervention to orchestrate the container lifecycle across multiple cloud servers.

A cloud container orchestrator may include a software platform that automates the deployment, management, and scaling of containerized applications across a cloud environment. The cloud container orchestrator may manage the lifecycle of containers by coordinating their provisioning, networking, scaling, and health checks. The cloud container orchestrator may allow developers to focus on application logic rather than the underlying infrastructure complexities. Examples of cloud container orchestrators may include Kubernetes®, Docker Swarm®, and Amazon EKS®. Kubernetes may be used as an example of a cloud container orchestrator.

A container may include a package of software that includes necessary elements to run in a variety of environments. The container may include a self-contained unit that packages an application's code, libraries, and dependencies together, allowing the container to be easily moved and run across different cloud environments without needing significant modifications to the underlying infrastructure. The container may act like a digital compartment that can be transported anywhere in the cloud. Containers may be portable instances of software that can run on physical and/or virtual machines. Cloud containers may include portable digital compartments that store application files in a runtime environment in the cloud. They may be like other digital containers but are housed in the cloud. A cloud container may include a container that runs on cloud infrastructure rather than on a local machine or in a data center.

Containers in cloud computing may be image files that contain elements needed to run software. The elements needed to run software include code, runtime, libraries, environment variables, and/or configuration files. In cloud computing, containers may be represented as image files because these images function as a blueprint. The image may contain necessary components like code, libraries, and configurations needed to run an application. The image may provide a snapshot of a complete runtime environment. The image may allow for easy deployment and replication across different cloud environments without needing to reconfigure the underlying system. The immutable, unchanging nature of the image may ensure consistency and facilitate efficient management of applications.

The container image may be immutable. Once they are created, the container image may be in a format that may not be directly modified. This may ensure that the application described by the container image runs the same way regardless of where it is deployed. The container image may be built up in layers. This may allow for sharing common components between different images. This may allow for precision masking based on a user's qualifications. The container image being built up in layers may facilitate dynamic masking as depending on a user's approval level, different layers in the container image may be dynamically masked. The container images may also be stored in a centralized repository. These repositories may be called container registries. Container registries may facilitate easy access and distribution.

The disclosed systems and methods may dynamically mask sensitive information on containers to protect the sensitive information from exposure to unauthorized or under authorized Kubernetes. Dynamic masking may refer to masking of sensitive information where the decision on whether to mask the sensitive information in question may be determined at the time the Kubernetes requests access to the sensitive information. Determination of the level of access to the sensitive information at the time of the request may be based on attribute values of the user requesting access, the data itself, and/or the environment or context in which the request is being made. The user's attribute values may include specific pieces of data associated with a user profile, such as their name, location, email address, job title, or any other custom fields that may act as descriptive data points used to identify and categorize the user within a system. The system and method may have pre-determined levels of access based on user attributes. These pre-determined levels may be applied dynamically when a Kubernetes seeks access to sensitive information on a container.

A cloud container environment may include a computing infrastructure where applications are packaged and run within containers. The containers may reside on a cloud platform. Packaging and running the applications within containers may allow the applications to be easily deployed, scaled, and managed across different cloud environments, with dependencies like code, libraries, and configuration files bundled within the container itself. The cloud container environment may include a way to run applications in a standardized and portable manner on cloud infrastructure.

A Kubernetes cluster may include a group of nodes that run containerized applications such as a master node, worker nodes, and a control plane. Nodes may include physical and/or virtual machines that run containers and other Kubernetes components. These nodes may include worker nodes. The master node may control the state of the cluster, including which applications are running and their corresponding container images. The control plane may manage the worker nodes and the pods in the cluster. A Kubernetes pod may include a group of containers that work together as a single unit to run an application. Pods may include small, deployable units in Kubernetes. Kubernetes pod may be a logical grouping of one or more containers within a Kubernetes cluster, essentially acting as a wrapper around those containers, allowing them to share resources like network and storage, while a cloud container is a single, isolated execution environment that runs an application on a cloud platform.

In Kubernetes, cluster resources may refer to shared hardware capabilities of nodes within a cluster. The shared hardware capabilities may include CPU, storage, memory, and network bandwidth. These shared hardware capabilities may be managed by the Kubernetes system. The shared hardware capabilities may be allocated to running containers and applications on the cluster. The shared hardware capabilities may include the collective computing power available to the cluster.

A Kubernetes container image may represent binary data that encapsulates an application and its software dependencies. Kubernetes container images may be executable software bundles that can run standalone. Kubernetes container images may make pre-defined assumptions about their runtime environment.

In a Kubernetes cluster, a node may refer to a single individual computer and/or virtual machine that acts as a part of a group of interconnected machines that work together as a single system to perform tasks. A node may be a building block of a cluster. Each node may contribute its processing power and resources to the overall cluster operation.

Kubernetes may be deployed as a Kubernetes cluster. The Kubernetes cluster may be deployed in a variety of locations. A Kubernetes cluster may be deployed in different environments such as on a physical machine or on a virtual machine. A Kubernetes cluster that is deployed on a virtual machine may include deployment on a virtual machine located with an organization, in a data center, or in the cloud. Deployment of Kubernetes clusters in any of these environments may allow containers to run across that environment as well as other environments as well.

It may be challenging to protect information residing on cloud containers from unauthorized Kubernetes cluster resources. Unauthorized Kubernetes cluster resources may include an attempt to access and/or modify resources within a Kubernetes cluster by a user and/or service account that does not have the necessary permissions. Access privileges and permissions may be used interchangeably. Both may refer to a degree of sensitive information on a cloud container that a Kubernetes, with certain permissions, may access. Permissions may typically be granted, for example, through Role-Based Access Control ("RBAC"). A service account in Kubernetes may include a non-human account that gives an identity to processes running in a pod. A service account may be used to: authenticate the cluster's Application Programming Interface ("API") server, implement identity-based security policies, enforce granular access control policies, and/or limit the privileges of individual pods.

Unauthorized access may indicate a misconfiguration in RBAC policies that grants more access than is warranted to a user and/or service account. Unauthorized access may include where a user and/or service account is not authorized to interact with those specific resources within the cluster that they are accessing but were able to access the specific resources by using other user credentials, such as the wrong username or password, to gain access. This access may lead to security risks if not properly managed.

Business users while performing their activities may be prone to scenarios where unauthorized Kubernetes cluster resources may view sensitive information on containers. There may be a need to provide mechanisms that protect the data when the data is stationary and/or to dynamically mask and/or redact sensitive information when a cloud container is exposed to Kubernetes. The degree of protection, masking, and/or redacting may be based on authorization of a user or service account.

Unauthorized Kubernetes cluster resources may include Kubernetes cluster components, like pods, deployments, services, and/or storage volumes, which are accessed or manipulated by a user and/or service account that does not have the proper permissions to do so. Accessing without proper permission may include access without authorization. This access may allow malicious actors to modify and/or view sensitive information within the cluster.

Unauthorized access to Kubernetes cluster resources may occur through a Kubernetes API server. The Kubernetes API server may be a central point for managing Kubernetes cluster resources. Access to the Kubernetes API server may allow attackers to modify cluster state without proper credentials.

Unauthorized access to Kubernetes may lead to security vulnerabilities. Attackers may create added resources, delete existing ones, access sensitive information stored in secrets, and/or disrupt running applications. Kubernetes may use RBAC to manage user permissions.

One way to manage unauthorized access by Kubernetes is by masking sensitive information on cloud containers. Access to the sensitive information on a cloud container may be granted in several ways. One way may be to grant access to the Kubernetes based on access privileges granted to the Kubernetes. Another may be to use RBAC to manage Kubernetes' privileges and/or permissions.

The masking of sensitive information on cloud containers may be dynamic. ML may be used to make the masking dynamic to function as an ML masking rule engine. For example, as a Kubernetes comes within view of the cloud container, the ML masking rule engine may take the presence of the Kubernetes into account. As the Kubernetes leaves the view of the cloud container, the ML masking rule engine may no longer take that Kubernetes into account.

When there are multiple Kubernetes within view of the cloud container, the ML masking rule engine may take each of the multiple Kubernetes into account. The output of the ML masking rule engine may be to mask the cloud container for all Kubernetes the same. The ML masking rule engine may mask the sensitive information on the cloud container to be sufficiently masked to protect the sensitive information on the cloud container from the Kubernetes with the least viewing privileges.

Alternatively, the output of the ML masking rule engine may be to provide different masking of the cloud container for each Kubernetes that is within view of the cloud container. Kubernetes with more viewing privileges may be subject to less masking. Kubernetes with less viewing privileges may be subject to more masking.

The disclosed systems and methods may describe, in one aspect, a system for use in detection and/or a method for detecting one or more Kubernetes users and/or service accounts by using a visualization tool on a cloud container. The visualization tool may include a camera on the cloud container. The camera on the container may detect Kubernetes that are accessing the cloud container. The camera may detect physical proximity. The camera may detect various system monitors that provide insight into how the Kubernetes is using the cloud container. The system monitors may be used to determine the extent of access to sensitive information on the cloud container the Kubernetes is permitted to have.

A snapshot may be a technique by which data is captured from a cloud container. The cloud container may reside in a private network. The cloud container may reside in a public network. The cloud container may reside in a hybrid network that includes elements of a private network and a public network. A public network may be accessible to anyone. It may be referred to as an unsecured network. The public network may be more vulnerable to cyberattacks, intrusions, and/or malware. A private network may be isolated and only accessible to authorized users. The private network may be more controlled and secure. The public network may be less secure than the private network.

The system and/or method may provide masking and/or redaction of sensitive information on cloud containers. The masking and/or redacting of sensitive information on a cloud container may be based on the Kubernetes user's and/or service account's proximity to the cloud container. The Kubernetes proximity may be determined by a visualization tool such as a camera in electronic connection to the cloud container. The camera in electronic contact with the cloud container may have a visual field of interest in which it monitors for the presence of Kubernetes. If the Kubernetes is within a pre-determined proximity threshold, a ML masking rule engine may initiate masking of sensitive information on the cloud container. The rule engine may be on the cloud container.

The visualization tool may determine Kubernetes proximity to a cloud container by observing computing activity of the Kubernetes in proximity to the cloud container. Increased computing activity by Kubernetes near the cloud container may provide a ML masking rule engine with information about which Kubernetes are gaining access to the cloud container. This information may provide guidance to the ML masking rule engine to determine what degree of masking and/or redacting is necessary to protect sensitive information on the cloud container.

Sensitive information may include personal information such as social security number, address, phone number, account number, National Provider Identifier ("NPI") data that may include a 10-digit numeric identifier assigned to health care providers by the Centers for Medicare & Medicaid Services (CMS), account information, and the like.

When there are multiple Kubernetes leveraging information on containers, the system and/or method may apply optimum masking depending on each Kubernetes profile and access level for viewing sensitive information. The degree of masking may be according to the Kubernetes that are within a pre-determined proximity threshold of the cloud container, including the cloud container setup. The degree of masking may be according to the Kubernetes within the pre-determined proximity that has the least authorization. The process of masking may include redacting fields containing sensitive information that are displayed on a container. Masking may include redacting source code displayed on the container having sensitive information. Masking may include redacting sensitive information fields on any cloud container interface of application.

Redacting source code may include removing or obscuring sensitive parts of a program's source code and thereby hiding sensitive information within the code before sharing it with others. Redacting source code may include replacing sensitive parts with placeholder values or completely removing lines of code containing sensitive information.

The apparatus and/or method may create an optimal and/or secure way of viewing sensitive information in a public cloud, a private cloud, and/or a hybrid of the two having one or more Kubernetes. The camera electronically linked to the cloud container, such as the cloud container setup, may determine Kubernetes that are closer to the cloud container than the proximity threshold. The Kubernetes and the cloud container may be in a public cloud. The Kubernetes and the cloud container may be in a private cloud. The Kubernetes and the cloud container may be in a hybrid of the public cloud and the private cloud.

A unique aspect of this disclosure may include dynamic masking of sensitive information on containers for places having multiple Kubernetes. This aspect may be unique in that it has not been implemented in the distributed cloud setup, including a cloud container environment. Another unique aspect may include providing a dynamic alert when an unauthorized Kubernetes is viewing sensitive information.

Examples of surprising and/or unexpected aspects of this disclosure may include, among other examples, the following:

Optimizing masking operation on a cloud container based on a Kubernetes' profile, proximity, and/or configuration;

Synchronization of cloud container field elements with dynamic Kubernetes in proximity at runtime;

Masking various fields on a container depending upon font size and Kubernetes proximity;

Dynamically modifying and/or rendering container data elements; and/or

Ability for primary Kubernetes to allow viewing access to another Kubernetes.

Provided are systems and methods for enhancing cloud container security in a network. Provided is a system for the enhancement of cloud container security in a network. The system may include a cloud container that is present in the network. The system may include a visualization tool. The system may include a visualization engine. The system may include a Kubernetes profile database. The system may include a deep learning engine. The system may include an ML masking rule engine.

The visualization tool may be configured to provide dynamic surveillance of the cloud container. Dynamic surveillance may include looking for the presence of one or more Kubernetes in dynamic proximity to the cloud container. A visualization engine may be configured to measure the dynamic proximity of the Kubernetes to the cloud container using data from the visualization tool.

When one or more Kubernetes are within a pre-determined proximity threshold of the cloud container, the deep learning engine may be configured to analyze the dynamic proximity data of the Kubernetes received from the visualization engine. The deep learning engine may use this data to determine the Kubernetes profile of the one or more Kubernetes.

The deep learning engine may be configured to determine a level of authorization of the Kubernetes by looking up the Kubernetes profile in a Kubernetes profile database. The Kubernetes profile database may include a pre-determined correlation between a Kubernetes profile and a level of authorization to access sensitive information on the cloud container. The Kubernetes profile may include a customized configuration of one or more Kubernetes.

The deep learning engine may be configured to provide the ML masking rule engine with the level of authorization of the Kubernetes. The ML masking rule engine may be configured to redact and/or mask a first group of sensitive information fields in the cloud container based on the first level of authorization of the Kubernetes. The ML masking rule engine may be configured to dynamically redact and/or mask a second group of sensitive information fields in the cloud container based on the second level of authorization of the Kubernetes. The second group of sensitive information fields may contain information whose confidentiality is more sensitive than the first group of sensitive information fields.

When two or more Kubernetes are within the visual field of interest of the cloud container and within the pre-determined proximity threshold of the cloud container, the method may further include redacting and/or masking, using the ML masking engine, a first group of sensitive information fields in the cloud container based on a level of authorization of the first Kubernetes. The ML masking engine may dynamically redact and/or dynamically mask a second group of sensitive information fields in the cloud container, in real time, based on the level of authorization of the first Kubernetes. The second group of sensitive information fields may include fields that are more sensitive than the first group of sensitive information fields.

Based on a level of authorization of the second Kubernetes, the method may use the ML masking engine to redact and/or mask a third group of sensitive information fields in the cloud container. The ML masking engine may dynamically redact and/or dynamically mask a fourth group of sensitive information fields in the cloud container, in real time, based on the level of authorization of the second Kubernetes. The fourth group of sensitive information fields may include fields that are more sensitive than the third group of sensitive information fields. The first group of sensitive information fields and the third group of sensitive information fields may be different from each other. The second group of sensitive information fields and the fourth group of sensitive information fields may be different from each other.

The cloud network may be a private cloud network. The cloud network may be a public cloud network. The cloud network may be a hybrid cloud network that includes aspects of a private cloud network and a public cloud network.

The cloud container may include a container image. Absent any redaction and masking of sensitive information fields in the cloud container, the container image may be visible to a Kubernetes when the Kubernetes is within the visual field of interest of the cloud container and/or is within the pre-determined proximity threshold of the cloud container.

The systems and methods described herein are illustrative. Systems and methods in accordance with this disclosure will now be described in connection with the figures, which form a part hereof. The figures show illustrative features of systems and methods in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments, such as systems and/or methods, may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Systems may omit features shown or described in connection with illustrative systems. Embodiments may include features that are neither shown nor described in connection with the illustrative systems. Features of illustrative systems may be combined. For example, an illustrative embodiment may include features shown in connection with another illustrative embodiment.

FIG. 1 shows illustrative block diagram 100. Block diagram 100 may include a system for enhancing cloud container security in a network. The network may be a private network. The network may be a public network. The network may be a hybrid network that includes aspects of a public network and aspects of a private network.

Cloud container 102 may contain secure information of varying levels of sensitivity that may need to be secured from public exposure. Cloud container 102 may include a software package that contains elements to run an application in the cloud. Cloud container 102 may run applications in a variety of computing environments. The elements may include code, libraries, dependencies, and/or settings. These elements may be included in a single file. This file may run in varying environments. The cloud container may virtualize a central processing unit ("CPU"), memory, storage, and/or network resources. These may create an isolated environment for the application the container is running in the cloud.

Visualization tool 104 may capture images related to cloud container 102. The images may be snapshots that show diagnostics related to the performance of cloud container 102. The diagnostics may identify the proximity of cloud container orchestrators to the cloud container. Cloud container orchestrators may include Kubernetes 106.

Visualization tool 104 may detect unauthorized access to cloud container 102. Visualization tool 104 may monitor container logs for suspicious activity. Visualization tool 104 may collect visuals regarding the security of cloud container 104. The visuals may be in the form of a snapshot of a metric such as access control lists ("ACLs"), network traffic, analyze container logs, and the like.

The ACLs may include a set of rules that define which users or systems are allowed or denied access to cloud container 102. The ACLs may function as a filter to control access to cloud container 102 by specifying which packets can pass through to cloud container 102 and which should be blocked. Visualization tool 104 may identify vulnerabilities in the ACLs based on analyzing Kubernetes 106 that are able to access cloud container 102.

Visualization tool 104 may provide snapshots to regularly review container logs for anomalies such as failed login attempts, unusual IP addresses, and/or unexpected system calls. Visualization tool 104 may provide snapshots to identify unusual network traffic patterns such as spikes in connections from unknown locations. Visualization tool 104 may analyze network flow logs to identify suspicious connections.

Visualization tool 104 may scan container images for vulnerabilities. A container image may include a ready-to-run software package containing each element necessary to run an application. The elements may include the code and any runtime the cloud container requires, application and system libraries, and/or default values for any critical settings.

Cloud container 102 may establish security 112 by requiring strong authentication by Kubernetes 106 before the latter is granted access to cloud container 102. Strong authentication may include authentication mechanisms such as multi-factor authentication ("MFA") to access cloud container 102.

Image capture engine 118 may provide images from visualization tool 104 to deep learning engine 120. An iterative training cycle 122 may be created between image capture engine 118 and deep learning engine 120. Training cycle 122 may provide images captured by image capture engine 118 from visualization tool 104 and provide these images to deep learning engine 120 to help train the latter.

Images from visualization tool 104 may provide dynamic proximity data of Kubernetes 106 to cloud container 102. Deep learning engine 120 may analyze dynamic proximity data of Kubernetes 106. The deep learning engine 120 may determine the level of authorization of Kubernetes 106 by determining the Kubernetes profile of each Kubernetes 106. The level of authorization of Kubernetes 106 may be determined by looking up the Kubernetes profile each of Kubernetes 106 in the Kubernetes profile database. The Kubernetes profile database may include pre-determined correlations between Kubernetes profiles and levels of authorizations to access sensitive information on the cloud container.

The Kubernetes profile may include a customized configuration of a Kubernetes cluster that allows a user to optimize each Kubernetes environment for specific use cases. Use cases may include development, testing, and/or production. The Kubernetes profile may allow for customizing the cluster behavior of a particular Kubernetes to meet the needs of a particular workload and/or environment.

Deep learning engine 120 may provide output containing a level of authorization for each Kubernetes 106 to masking rule engine 124. The level of authorization may be used by masking rule engine 124 to determine how much to redact and/or mask secure information found on and/or associated with the cloud containers.

Cloud containers 126 may be redacted and/or dynamically masked based on output from the masking rule engine 124. Redaction and masking of data in cloud containers 126 may be a function of the level of authorization of Kubernetes in the vicinity of cloud containers 126 and the proximity of Kubernetes to cloud containers 126. For example, Kubernetes that are located relatively near cloud containers 126 may be within field of view 130 of the latter, such as Kubernetes 134 and 136, or outside field of view 130 of cloud contains 126, such as Kubernetes 138. The Kubernetes may within pre-determined proximity threshold 132, such as Kubernetes 134 and 138, or outside the threshold, such as Kubernetes 136. In one aspect, only Kubernetes that are both within field of view 130 and within pre-determined proximity threshold 132 may be considered when determining redaction and/or dynamic masking 128.

The dynamic position of the Kubernetes may change over time. As the dynamic position changes, the need for redaction and/or masking 128 may also change. Visualization tool 104, image capture engine 118, deep learning engine 120, and/or masking rule engine 124 may be used alone, or together, to determine and/or apply redaction and/or dynamic masking 128 over time.

Redaction and/or dynamic masking 128 applied to cloud containers 126 may result in similar redaction and/or dynamic masking 128 to any Kubernetes viewing the cloud containers 126. Redaction and/or dynamic masking 128 applied to cloud containers 126 may result in customized redaction and/or dynamic masking 128 for each Kubernetes viewing the cloud containers 126.

Figure 2:
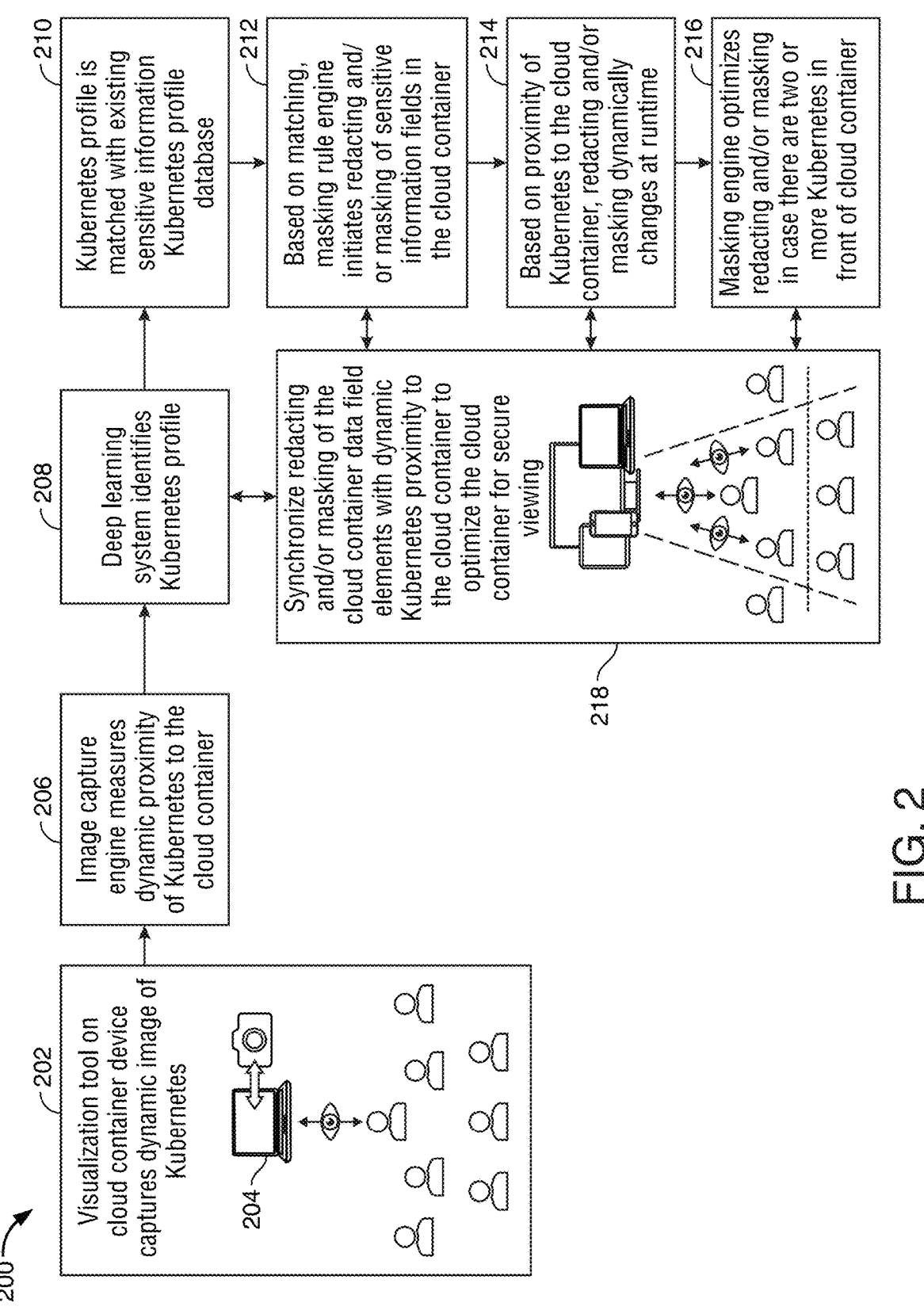
FIG. 2 shows an illustrative block diagram of a system configured to enhance cloud container security in a cloud network.

FIG. 2 shows illustrative block diagram 200. Block diagram 200 may include step 202 that may show the visualization tool on cloud container device capturing a dynamic image of Kubernetes, as depicted in 204.

At step 206, the image capture engine may measure dynamic proximity of Kubernetes to the cloud container. At step 208, the deep learning system may identify Kubernetes dynamic images.

At step 210, Kubernetes profile may be matched with existing sensitive information Kubernetes profile database. This may contribute to determining what level of access identified Kubernetes may have.

At step 212, based on matching the Kubernetes profile with the Kubernetes profile database, masking rule engine may initiate redaction and/or masking of sensitive information fields in the cloud container. At step 214, based on proximity of Kubernetes to the cloud container, redacting and/or masking dynamically changes at runtime.

At step 216, masking engine optimize redacting and/or masking in case there are two or more Kubernetes in front of the cloud container. At step 218, synchronize redacting and/or masking of the cloud container data field elements with dynamic Kubernetes proximity to the cloud container, as depicted in 220, to optimize the cloud container for secure viewing.

Figure 3:
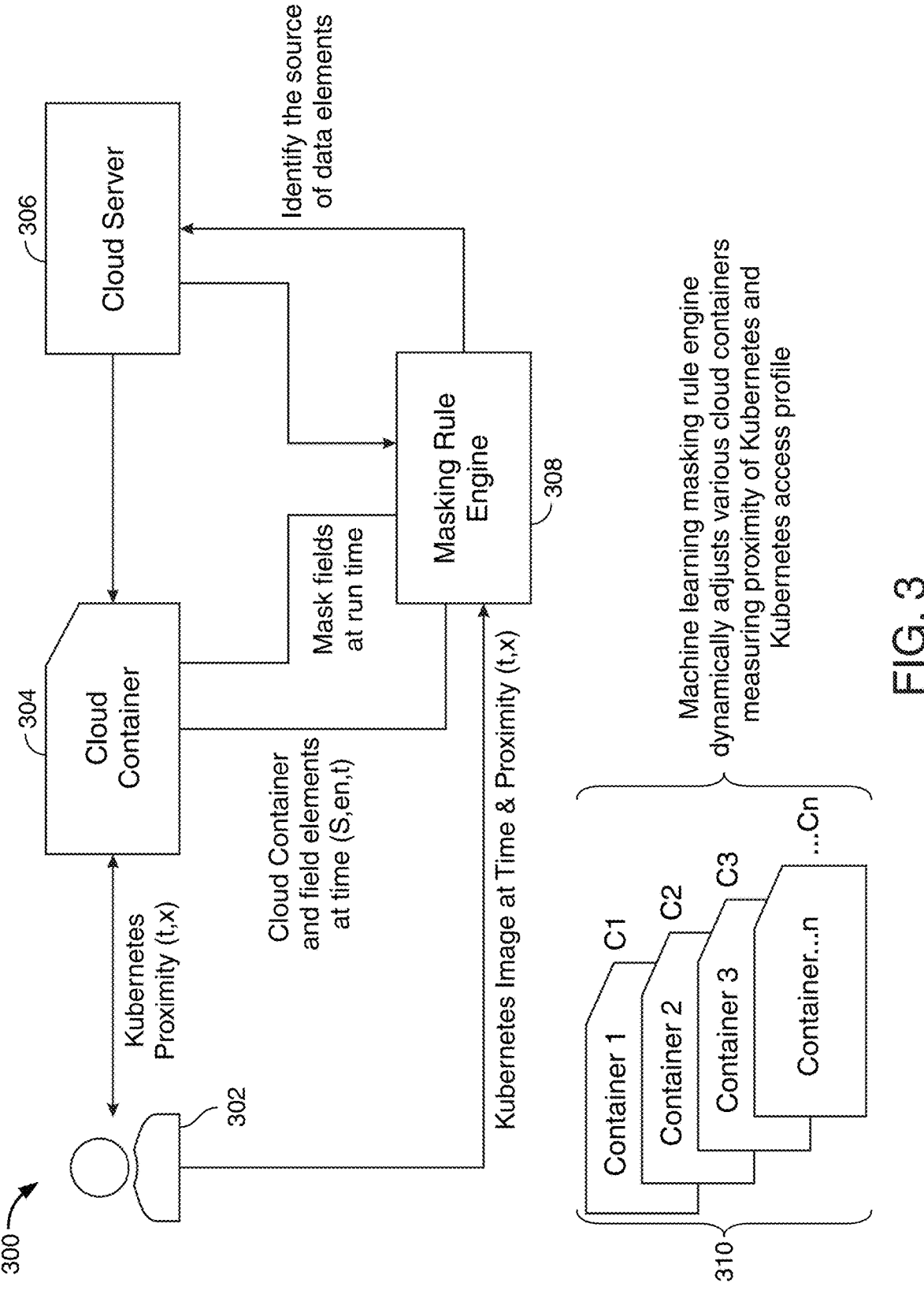
FIG. 3 shows an illustrative block diagram of a system configured to enhance cloud container security in a cloud network.

FIG. 3 shows illustrative block diagram 300. At 302, a Kubernetes is depicted. At 304, a cloud container is depicted. The proximity "x" of the Kubernetes to the cloud container at time "t" may be determined. At 306, a cloud server is depicted. The cloud server may contain the cloud container. At 308, a masking rule engine is depicted. The masking rule engine may be an ML masking rule engine.

Kubernetes image at time "t" and proximity "x" may be provided to the masking rule engine. Cloud container "S" and field elements "en" at time "t" may be provided to the masking rule engine. Masking rule engine may mask fields of cloud container at run time. Masking rule engine may identify the source of the data elements to be masked from the cloud server.

At 310, the ML masking rule engine may dynamically adjust as various containers are evaluated. For each container, the ML masking rule engine may determine proximity of Kubernetes are various time points. The ML masking rule engine may also determine the Kubernetes access profile.

Figure 4:
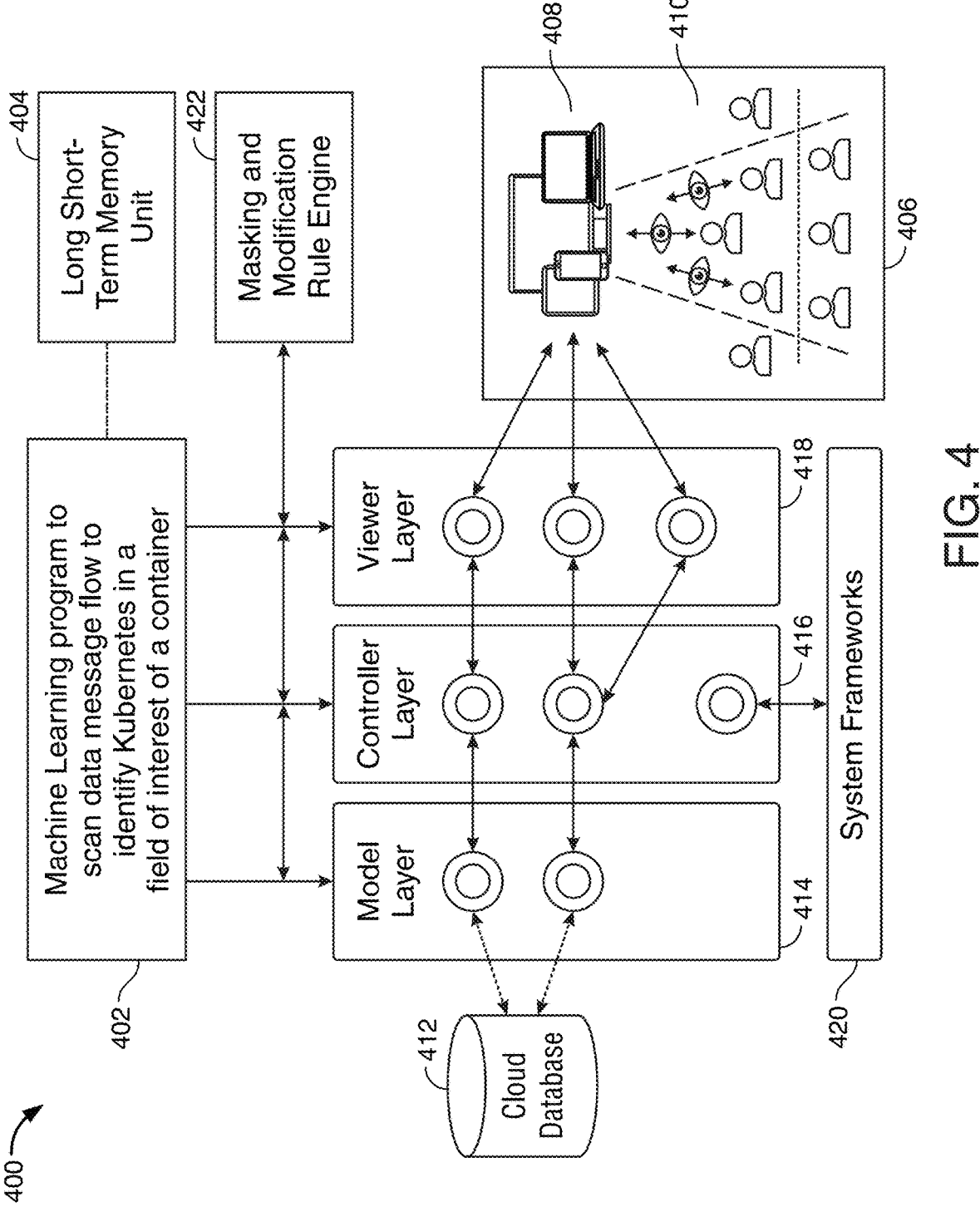
FIG. 4 shows an illustrative block diagram of layers of the deep learning model and the machine learning masking rule engine.

FIG. 4 shows an illustrative block diagram of layers of the deep learning model and the machine learning masking rule engine. At 402, depicted is a deep learning ML program to scan data message flow in model viewer controller layer. The data message flow is linked to a visual field of interest. A recurrent neural network (RNN) may be established. The RNN may utilize a long short-term memory (LSTM) 404. The LSTM may observe the cloud containers 408 and Kubernetes 410, both found in cloud computing system 406.

Deep learning model 402 may interact with various layers. Layers may include model layer 414, controller layer 416, and viewer layer 418. These layers may obtain data from cloud database ("DB") 412. System frameworks 420 may interact with specific components of the layers and coordinate the functioning of the components. Output for the layers may be provided to the cloud containers 408. Output from the cloud containers 408 may be provided to the layers, initially through viewer layer 418.

Figure 5B:
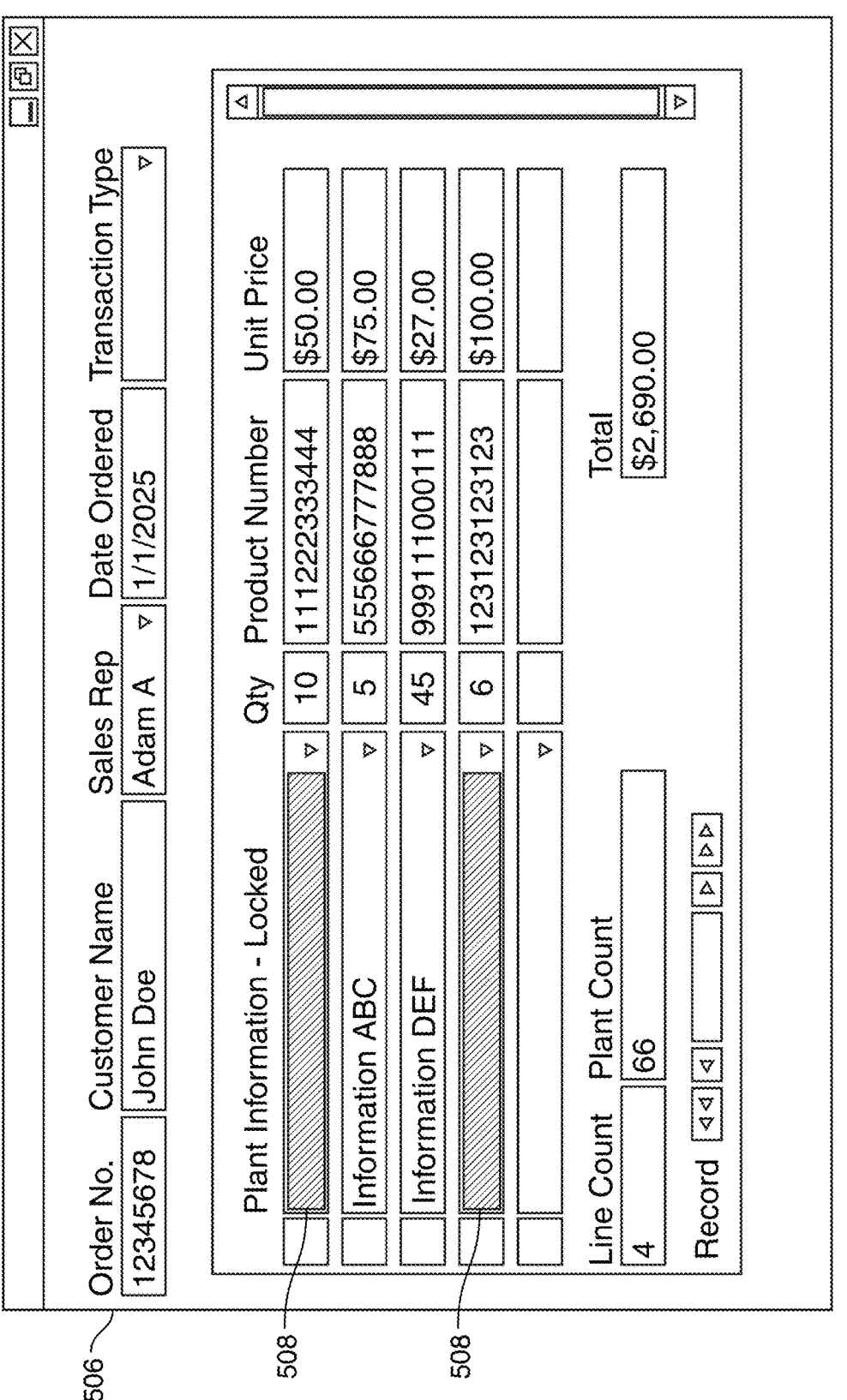
FIG. 5B shows an illustrative block diagram of masking on a user interface of a cloud container.

FIG. 5A shows an illustrative block diagram of masking on source code displayed on a cloud container. Source code may be depicted as 502. Masking may be depicted as 504. Based on image feed of Kubernetes, the masking engine may detect optimal masking on source code displayed on a cloud container FIG. 5B shows an illustrative block diagram of masking on a user interface of a cloud container. User interface may be depicted as 506. Masking may be depicted as 508. Based on image feed of Kubernetes the masking engine detects optimal masking on a user interface of a cloud container.

FIG. 6A shows an illustrative flowchart of a system configured to enhance cloud container security in a cloud network. Presented at step 602 may be a method for enhancing cloud container security in a cloud network. Presented at step 604 may be a visualization tool that provides dynamic surveillance of a cloud container, at fixed intervals of time. The visualization tool may detect the presence of one or more Kubernetes in dynamic proximity to the cloud container. The cloud container and said visualization tool present in the cloud network.

At step 606, the visualization engine may measure dynamic proximity of the one or more Kubernetes to the cloud container, at fixed intervals of time, using images from the visualization tool. At step 608, when one or more Kubernetes are within a visual field of interest of the cloud container and a pre-determined proximity threshold of the cloud container, deep learning engine analyzes dynamic proximity data of the one or more Kubernetes received from the visualization engine to determine the Kubernetes profile of the one or more Kubernetes. The method continues with FIG. 6B at step 610.

FIG. 6B shows an illustrative flowchart of a system configured to enhance cloud container security in a cloud network and is a continuation from step 608 in FIG. 6A. At step 610, the deep learning engine may determine a level of authorization for the one or more Kubernetes by looking up the Kubernetes profile in a Kubernetes profile database. A Kubernetes profile database includes pre-determined correlations between a Kubernetes profile and a level of authorization to access sensitive information on the cloud container. The Kubernetes profile may include a customized configuration of one or more Kubernetes.

At step 612, the deep learning engine may provide an ML masking rule engine with the level of authorization of the Kubernetes. At step 614, the ML masking rule engine may redact and/or mask a first group of sensitive information fields in the cloud container based on the level of authorization of the Kubernetes. At step 616, the ML masking rule engine may dynamically redact and/or dynamically mask a second group of sensitive information fields in the cloud container, in real time, based on the level of authorization of the Kubernetes. The second group of sensitive information fields may include fields that are more sensitive than the first group of sensitive information fields.

Figure 7:
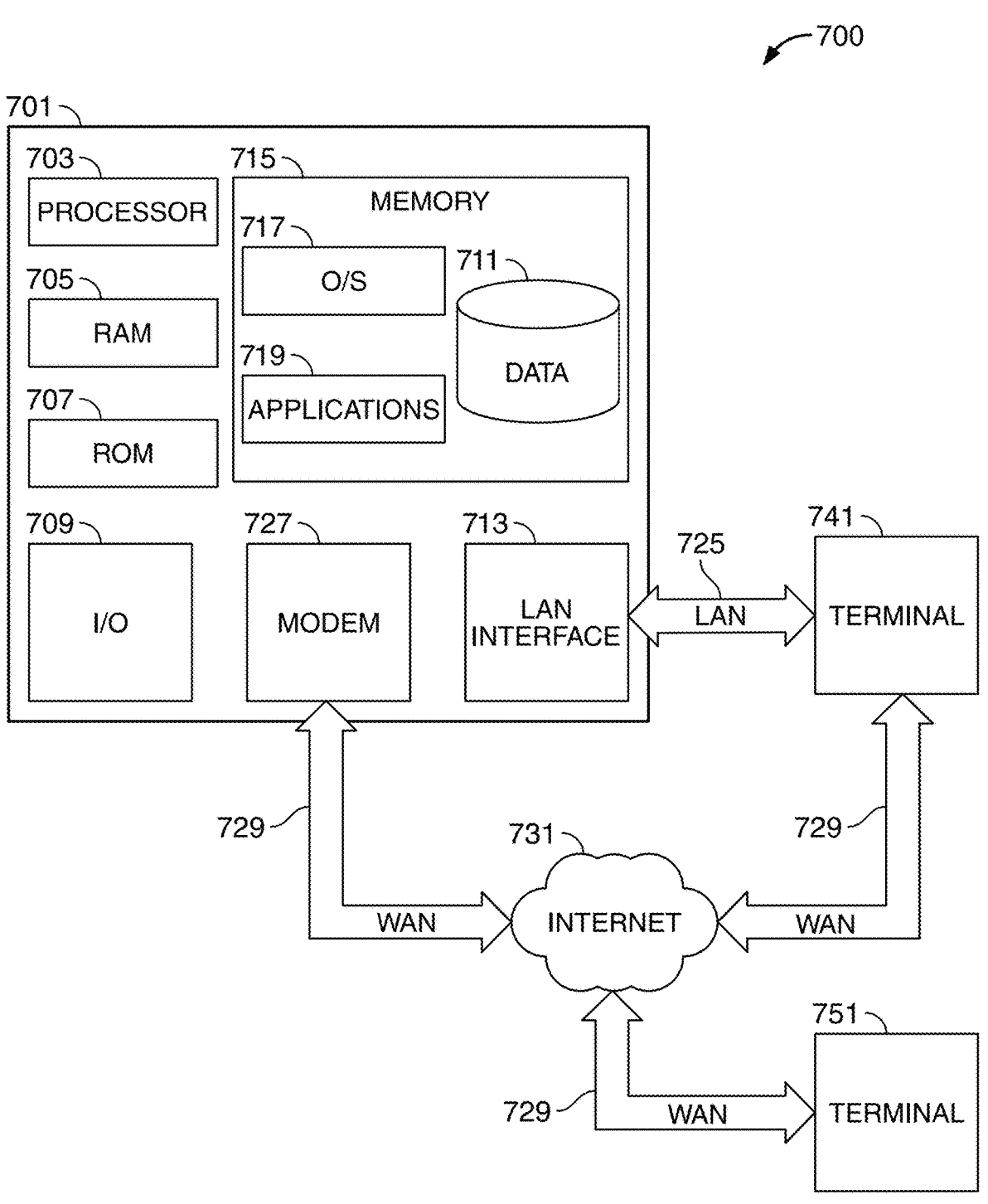
FIG. 7 shows an illustrative block diagram in accordance with principles of the disclosure.

FIG. 7 shows an illustrative block diagram of system 700 that includes computer 701. Computer 701 may alternatively be referred to herein as an "engine," "server" or a "computing device." Computer 701 may be a workstation, desktop, laptop, tablet, smartphone, or any other suitable computing device. Elements of system 700, including computer 701, may be used to implement various aspects of the systems and methods disclosed herein, including those shown in FIGS. 1-4, 5A, 5B, 6A, and 6B. Each of the systems, methods, and algorithms illustrated in FIGS. 1-4, 5A, 5B, 6A, and 6B may include some or all the elements of system 700.

Computer 701 may have a processor 703, including a central processing unit ("CPU"), for controlling the operation of the device and its associated components, and may include RAM 705, ROM 707, input/output ("I/O") 709, and a non-transitory or non-volatile memory 715. Machine-readable memory may be configured to store information in machine-readable data structures. Processor 703 may also execute all software running on the computer. Other components, such as graphics processing unit ("GPU"), EEPROM, Flash memory, neural-network processing elements, or any other suitable components, may also be part of the computer 701.

Memory 715 may be comprised of any suitable permanent storage technology, such as a hard drive. Memory 715 may store software including the operating system 717 and application program(s) 719 along with any data 711 needed for the operation of system 700. Memory 715 may also store videos, text, and/or audio assistance files. The data stored in memory 715 may also be stored in cache memory, or any other suitable memory.

I/O module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

System 700 may be connected to other systems via a local area network interface 713. System 700 may operate in a networked environment supporting connections to one or more remote computers, such as terminals 741 and 751. Terminals 741 and 751 may be personal computers or servers that include many, or all the elements described above relative to system 700. The network connections depicted in FIG. 7 include a local area network ("LAN") 725 and a wide area network ("WAN") 729 but may also include other networks. When used in a LAN networking environment, computer 701 is connected to LAN 725 through LAN interface 713 or an adapter. When used in a WAN networking environment, computer 701 may include a modem 727 or other means for establishing communications over WAN 729, such as Internet 731.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or an API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 719, which may be used by computer 701, may include computer executable instructions for invoking functionality related to communication, such as e-mail, Short Message Service ("SMS"), and voice input and speech recognition applications. Application program(s) 719 (which may be alternatively referred to herein as "plugins," "applications," or "apps") may include computer executable instructions for invoking functionality related to performing various tasks. Application program(s) 719 may utilize one or more algorithms that process receive executable instructions, perform power management routines or other suitable tasks.

Application program(s) 719 may include computer executable instructions (alternatively referred to as "programs"). The computer executable instructions may be embodied in hardware or firmware (not shown). Computer 701 may execute the instructions embodied by the application program(s) 719 to perform various functions.

Application program(s) 719 may utilize the computer-executable instructions executed by a processor. Programs may include routines, programs, objects, components, data structures, and the like, which perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 711, and any other suitable information, may be stored in memory 715.

The disclosure may be described in the context of computer-executable instructions, such as application(s) 719, being executed by a computer. Programs may include routines, programs, objects, components, data structures, and the like, which perform tasks or implement data types. The computer-executable instructions may be located on one or more non-transitory computer-readable media. The computer-executable instructions, when executed by processor 703, may be used to implement various aspects of the systems and methods disclosed herein.

The disclosure may also be practiced in distributed computing environments. Tasks may be performed by remote processing devices that are linked through a communications network. A communications network may include a computer network. In a distributed computing environment, programs may be in both local and remote computer storage media including memory storage devices. It should be noted that such programs may be considered for the purposes of this application as engines with respect to the performance of the tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 741 and/or terminal 751 may be portable devices such as a laptop, cell phone, tablet, smartphone, or any other computing system for receiving, storing, transmitting, and/or displaying relevant information. Terminal 741 and/or terminal 751 may be one or more user devices. Terminals 741 and 751 may be identical to system 700 or different. Differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 8:
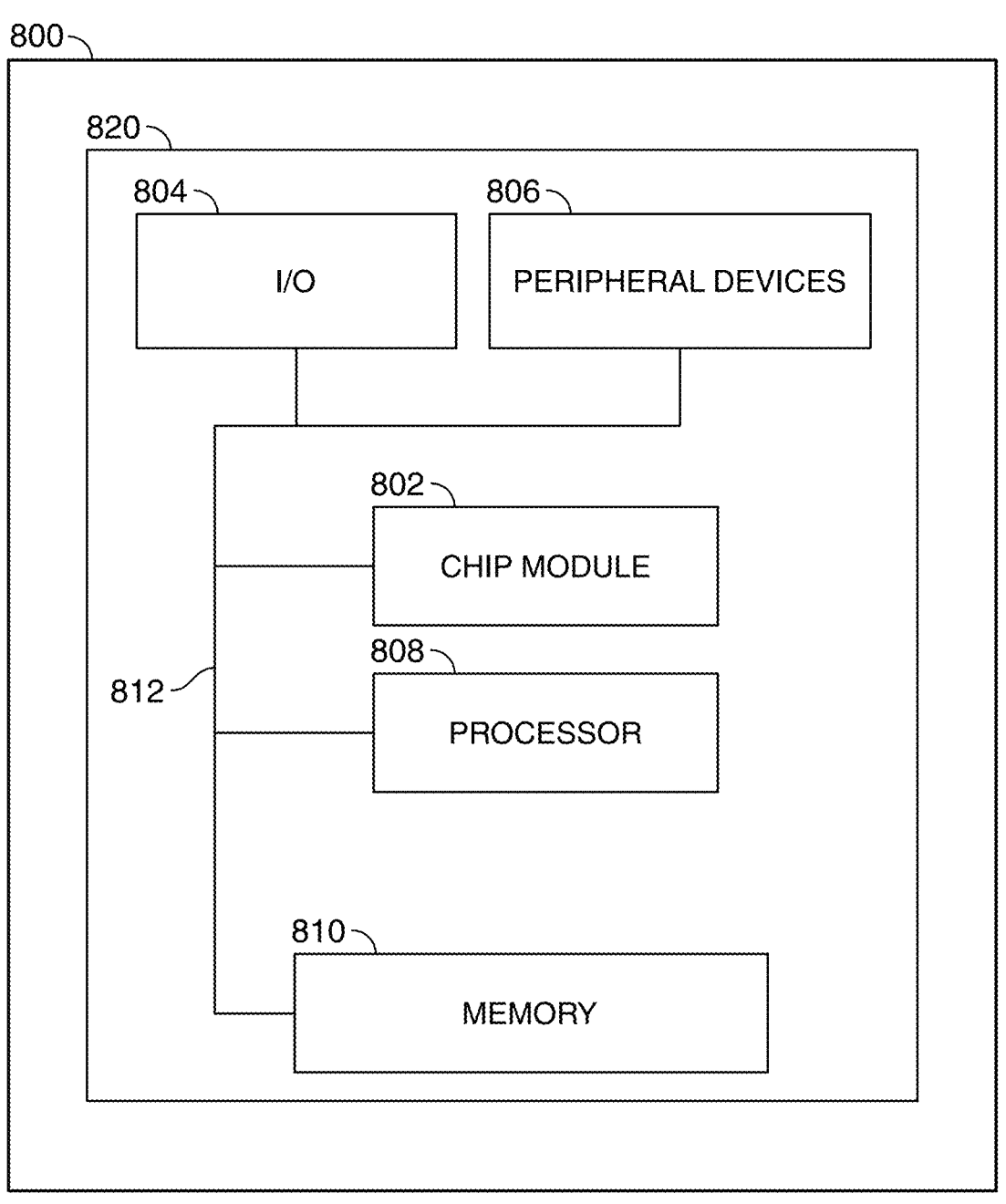
FIG. 8 shows an illustrative block diagram in accordance with principles of the disclosure.

FIG. 8 shows an illustrative system 800 that may be configured in accordance with the principles of the disclosure. System 800 may be a computing device. System 800 may include one or more features of the apparatus shown in FIGS. 1-4, 5A, 5B, 6A, 6B, and 7. System 800 may include chip module 802, that may include one or more integrated circuits, and that may include logic configured to perform any other suitable logical operations.

System 800 may include one or more of the following components: I/O circuitry 804, that may include a transmitter device and a receiver device and may interface with fiber optic cable, coaxial cable, telephone lines, wireless devices, PHY layer hardware, a keypad/display control device or any other suitable media or devices; peripheral devices 806, that may include counter timers, real-time timers, power-on reset generators or any other suitable peripheral devices; logical processing device 808, that may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 719 (shown in FIG. 7), signals, and/or any other suitable information or data structures.

A system bus or other interconnections 812 may couple components 802, 804, 806, 808 and 810 and may be present on one or more circuit boards such as circuit board 820. In some embodiments, a single chip may integrate the components. The chip may be silicon-based.

Elements of system 800, including circuit board 820 and various coupled components found on circuit board 830, may be used to implement various aspects of the systems and methods disclosed herein, including those shown in FIGS. 1-5, 6A, 6B, and 7. Each of the systems and methods illustrated in FIGS. 1-4, 5A, 5B, 6A, 6B, and 7 may include some or all the elements of system 800.

Thus, provided may be systems and methods relating to enhancing cloud container security in a cloud network. People skilled in the art will appreciate that the present invention can be practiced by other than the described embodiments, which are presented for purposes of illustration rather than of limitation. The present invention is limited only by the claims that follow.

What is claimed is:

1. A system for enhancing cloud container security in a cloud network, the system comprising:
   a cloud container;
   a visualization tool;
   a visualization engine;
   a Kubernetes® profile database;
   a deep learning engine;
   a machine learning ("ML") masking rule engine;
   said visualization tool configured to provide, at fixed intervals of time, dynamic surveillance of the cloud container for presence of one or more Kubernetes in dynamic proximity to the cloud container, said cloud container and said visualization tool present in the cloud network;
   said visualization engine configured to measure dynamic proximity of one or more Kubernetes to the cloud container, at fixed intervals of time, using data from the visualization tool;
   when one or more Kubernetes are within a visual field of interest of the cloud container and within a pre-determined proximity threshold of the cloud container, said deep learning engine is configured to:
   analyze dynamic proximity data of the one or more Kubernetes received from the visualization engine to determine a Kubernetes profile of the one or more Kubernetes;
   determine a level of authorization for the one or more Kubernetes by looking up the Kubernetes profile of the one or more Kubernetes in the Kubernetes profile database;
      wherein said Kubernetes profile database comprises pre-determined correlations between a Kubernetes profile and a level of authorization to access sensitive information on the cloud container, said Kubernetes profile comprises a customized configuration of each of the one or more Kubernetes;
   provide the ML masking rule engine with the level of authorization of the Kubernetes;
   the ML masking rule engine is configured to:
   redact and/or mask a first group of sensitive information fields in the cloud container based on the level of authorization of the Kubernetes;
   dynamically redact and/or dynamically mask a second group of sensitive information fields in the cloud container, in real time, based on the level of authorization of the Kubernetes;
      wherein the second group of sensitive information fields comprise fields that are more sensitive than the first group of sensitive information fields.

2. The system of claim 1 wherein, when two or more Kubernetes are within the visual field of interest of the cloud container and within the pre-determined proximity threshold of the cloud container, further comprising:
   the ML masking rule engine is configured to:
   redact and/or mask a first group of sensitive information fields in the cloud container based on a level of authorization of a first Kubernetes;
   dynamically redact and/or dynamically mask a second group of sensitive information fields in the cloud container, in real time, based on the level of authorization of the first Kubernetes;
      wherein the second group of sensitive information fields comprise fields that are more sensitive than the first group of sensitive information fields;

redact and/or mask a third group of sensitive information fields in the cloud container based on a level of authorization of a second Kubernetes; and
   dynamically redact and/or dynamically mask a fourth group of sensitive information fields in the cloud container, in real time, based on the level of authorization of the second Kubernetes;
   wherein:
      the fourth group of sensitive information fields comprise fields that are more sensitive than the third group of sensitive information fields;
      the first group of sensitive information fields and the third group of sensitive information fields are different from one another; and
      the second group of sensitive information fields and the fourth group of sensitive information fields are different from one another.

3. The system of claim 1 wherein the cloud network is a private cloud network.

4. The system of claim 1 wherein the cloud network is a public cloud network.

5. The system of claim 1 wherein the cloud network is a hybrid cloud network, said hybrid cloud network comprises aspects of a private cloud network and aspects of a public cloud network.

6. The system of claim 1 wherein:
   the cloud container comprises a container image; and
   before redaction and masking, the container image is visible to a Kubernetes that is within the visual field of interest of the cloud container and is within the pre-determined proximity threshold of the cloud container.

7. The system of claim 1 wherein the visualization tool is a camera.

8. A method for enhancing cloud container security in a cloud network, the method comprising:
   providing, using a visualization tool, dynamic surveillance of a cloud container, at fixed intervals of time, for presence of one or more Kubernetes® in dynamic proximity to the cloud container, said cloud container and said visualization tool present in the cloud network;
   measuring, using a visualization engine, dynamic proximity of one or more Kubernetes to the cloud container, at fixed intervals of time, using images from the visualization tool;
   when one or more Kubernetes are within a visual field of interest of the cloud container and a pre-determined proximity threshold of the cloud container, analyzing, using a deep learning engine, dynamic proximity data of the one or more Kubernetes received from the visualization engine to determine a Kubernetes profile of the one or more Kubernetes;
   determining, using the deep learning engine, a level of authorization for the one or more Kubernetes by looking up the Kubernetes profile in a Kubernetes profile database;
      wherein said Kubernetes profile database comprises pre-determined correlations between a Kubernetes profile and a level of authorization to access sensitive information on the cloud container, said Kubernetes profile comprises a customized configuration of the one or more Kubernetes;
   providing, using the deep learning engine, a machine learning ("ML") masking rule engine with the level of authorization of the Kubernetes;

redacting and/or masking, using the ML masking rule engine, a first group of sensitive information fields in the cloud container based on the level of authorization of the Kubernetes;

dynamically redacting and/or dynamically masking, using the ML masking rule engine, a second group of sensitive information fields in the cloud container, in real time, based on the level of authorization of the Kubernetes;

wherein the second group of sensitive information fields comprise fields that are more sensitive than the first group of sensitive information fields.

9. The method of claim 8 wherein, when two or more Kubernetes are within the visual field of interest of the cloud container and within the pre-determined proximity threshold of the cloud container, further comprising:

redacting and/or masking, using the ML masking engine, a first group of sensitive information fields in the cloud container based on a level of authorization of a first Kubernetes;

dynamically redacting and/or dynamically masking, using the ML masking engine, a second group of sensitive information fields in the cloud container, in real time, based on the level of authorization of the first Kubernetes;

wherein the second group of sensitive information fields comprise fields that are more sensitive than the first group of sensitive information fields;

redacting and/or masking, using the ML masking engine, a third group of sensitive information fields in the cloud container based on a level of authorization of a second Kubernetes; and dynamically redacting and/or dynamically masking, using the ML masking engine, a fourth group of sensitive information fields in the cloud container, in real time, based on the level of authorization of the second Kubernetes;

wherein:

the fourth group of sensitive information fields comprise fields that are more sensitive than the third group of sensitive information fields;

the first group of sensitive information fields and the third group of sensitive information fields are different from one another; and the second group of sensitive information fields and the fourth group of sensitive information fields are different from one another.

10. The method of claim 8 wherein the cloud network is a private cloud network.

11. The method of claim 8 wherein the cloud network is a public cloud network.

12. The method of claim 8 wherein the cloud network is a hybrid cloud network, said hybrid cloud network comprises aspects of a private cloud network and aspects of a public cloud network.

13. The method of claim 8 wherein:

the cloud container comprises a container image; and before redaction and masking, the container image is visible to a Kubernetes that is within the visual field of interest of the cloud container and is within the pre-determined proximity threshold of the cloud container.

14. A system for enhancing cloud container security in a cloud network, the system comprising:

a cloud container;

a visualization tool;

a visualization engine;

a Kubernetes® profile database;

a deep learning engine;

a machine learning ("ML") masking rule engine;

said visualization tool configured to provide, at fixed intervals of time, dynamic surveillance of the cloud container for presence of two or more Kubernetes in dynamic proximity to the cloud container, said cloud container and said visualization tool present in the cloud network;

said visualization engine configured to measure dynamic proximity of two or more Kubernetes to the cloud container, at fixed intervals of time, using data from the visualization tool;

when two or more Kubernetes are within a visual field of interest of the cloud container and within a pre-determined proximity threshold of the cloud container, said deep learning engine is configured to:

analyze dynamic proximity data of the two or more Kubernetes received from the visualization engine to determine a Kubernetes profile for each of the two or more Kubernetes;

determine a level of authorization for each of the two or more Kubernetes by looking up the Kubernetes profile for each of the two or more Kubernetes in the Kubernetes profile database;

wherein said Kubernetes profile database comprises pre-determined correlations between a Kubernetes profile and a level of authorization to access sensitive information on the cloud container, said Kubernetes profile comprises a customized configuration of the one or more Kubernetes;

determine which level of authorization from the two or more Kubernetes provides a least level of authorization;

provide the ML masking rule engine with the least level of authorization for the two or more Kubernetes;

the ML masking rule engine is configured to:

redact and/or mask a first group of sensitive information fields in the cloud container based on the least level of authorization of the two or more Kubernetes;

dynamically redact and/or dynamically mask a second group of sensitive information fields in the cloud container, in real time, based on the least level of authorization of the Kubernetes;

wherein the second group of sensitive information fields comprise information that is more sensitive than the first group of sensitive information fields.

15. The system of claim 14 wherein determination of the least level of authorization is based on the level of authorization of a Kubernetes that has a least amount of privileges to view sensitive information from the two or more Kubernetes.

16. The system of claim 14 wherein the cloud network is a private cloud network.

17. The system of claim 14 wherein the cloud network is a public cloud network.

18. The system of claim 14 wherein the cloud network is a hybrid cloud network, said hybrid cloud network comprises aspects of a private cloud network and aspects of a public cloud network.

19. The system of claim 14 wherein:

the cloud container comprises a container image; and before redaction and masking, the container image is visible to a Kubernetes that is within the visual field of interest of the cloud container and is within the pre-determined proximity threshold of the cloud container.

20. The system of claim 14 wherein the visualization tool is a camera.

* * * * *